Aug. 16, 1938.  W. H. SNYDER  2,126,930
MECHANISM FOR DIVIDING AND COALESCING IMAGES
Original Filed Dec. 10, 1928

Inventor,
Ward H. Snyder,

Patented Aug. 16, 1938

2,126,930

UNITED STATES PATENT OFFICE 2,126,930

MECHANISM FOR DIVIDING AND COALESCING IMAGES

Ward H. Snyder, Miami, Fla., assignor of one-third to Frank F. Farkas and one-third to E. N. Farkas, both of Chicago, Ill.

Refiled for abandoned application Serial No. 324,904, December 10, 1928. This application October 14, 1937, Serial No. 169,064

2 Claims. (Cl. 88—1)

In certain systems of color photography, in which it is the object to secure a picture as near as may be in the natural colors of the object which is photographed, and also in certain systems for the projection of pictures in their natural colors it is necessary to secure a plurality, usually three, identical views of the object, each of which is subjected to the action of a different color filter, and when the views have been developed and stained, or otherwise colored, it is necessary to combine or coalesce these views to produce a single multi-colored image.

My present invention relates to the provision of simple mechanism or instrumentalities for securing a plurality of images of an object or view and for combining and coalescing such separate views into a single projected image.

Photographic lenses, by reason of their curvature and the refracting properties of the material from which they are made, have the power of focusing all the light received over their entire surface from a particular point in the object to a particular point in the image formed at the focal plane of the lens. This fact is well known and has been taken advantage of in the provision of various forms of diaphragms for reducing light passed through the lens and also in the instrument called a sextant employed in navigation, as it is found that a portion of a lens will form the same image as the entire lens with the principal difference that the image formed by a portion of the lens only will be less brilliantly illuminated than the image formed by the entire lens. This principle is operative when the diaphragm or light excluding element is placed in front of the lens or behind the lens or between the elements of a compound lens, it being only necessary to place the light limiting element out of the planes of foci of the lens and within the space of the diverging illumination from the points in the object or within the space where the light is being converged by the lens to form the points in the image.

I have found that by placing a reflector between the lens and its focal plane, notwithstanding the fact that the reflector may not receive all of the light from the lens, a complete image of the object may be secured from the light thus reflected, and that a plurality of reflectors properly so placed that each will reflect a portion of the light from the lens will produce an equal number of identical images. The light forming such images may obviously be passed through different filters and photographed. Also, obviously, separate views suitably stained or otherwise colored through the use of filters, or otherwise placed in proper relation to the reflectors and lens and illuminated, will be recombined and coalesced to form a single projected image.

I have attained the above mentioned objects and secured the above mentioned results by means of the mechanism illustrated in the accompanying drawing, in which—

Similar reference characters refer to similar parts throughout the respective views.

Figure 1:
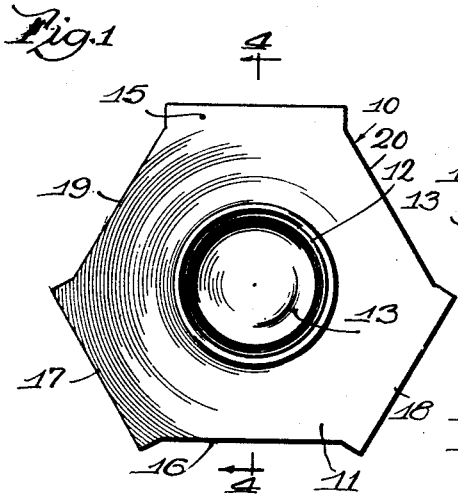
Fig. 1 is a front elevation of a structure embodying my invention.
Figure 2:
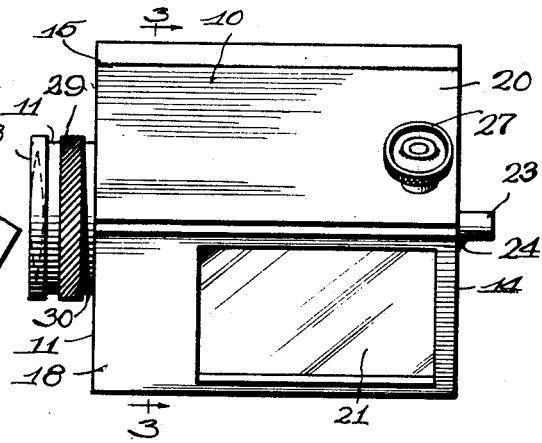
Fig. 2 is a side elevation of the structure shown in Fig. 1.
Figure 3:
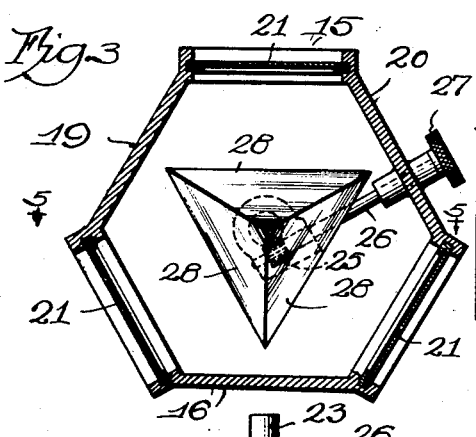
Fig. 3 is a section on line 3—3 of Fig. 2.
Figure 4:
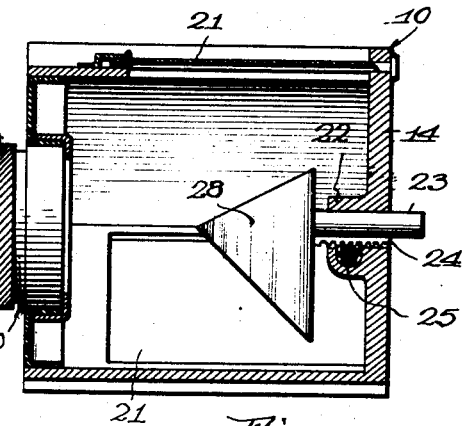
Fig. 4 is a section on line 4—4 of Fig. 1.
Figure 5:
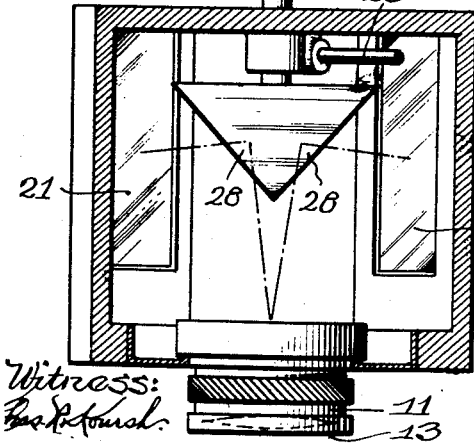
Fig. 5 is a section on line 5—5 of Fig. 3.
Figure 6:
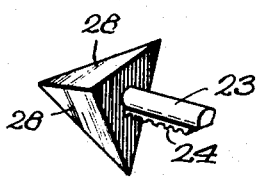
Fig. 6 is a perspective of an arrangement of reflectors suitable for practising my invention.

The apparatus consists of a camera casing 10 in the center of one end 11 of which is mounted a lens barrel 12 having mounted therein a photographic lens or objective 13. The end 11 of the camera casing and the end 14 opposite thereto are parallel and the panels connecting the ends 11 and 14 are given a hexagonal relation to each other, which I find convenient in the construction of an instrument for securing three simultaneous views of the same object.

I have designated the top and bottom panels connecting the ends with the numbers 15 and 16 respectively, the lower side panels 17 and 18 respectively, and the upper side panels 19 and 20 respectively. The panels 15, 17 and 18 toward the end 14 are apertured and provided with guideways adjacent the aperture to receive translucent screens and plate holders 21, it being understood that either plate holders or screens may be inserted in these guideways for the purpose of examining the images or photographing the same as occasion may require.

The end wall 14 is provided with an interior central embossment 22 which is centrally bored and slotted to take a shaft 23 having extending from one side thereof a rack 24. The embossment 22 is transversely bored to receive a pinion 25 which engages the rack 24, the pinion 25 being positioned upon a shaft 26 extended through the panel 20 of the casing and provided on its exterior end with a knurled head 27, by means of which the shaft 23 may be longitudinally adjusted.

Upon the inner end of the shaft 23 is mounted a pyramidal formed object having, in this particular embodiment, three triangular reflecting surfaces 28, the bases whereof are parallel with the planes of the screens or plate holders 21 and the apexes of which incline forwardly and inwardly to a point in the optical axis of the lens 13.

The light passing through the lens 13 strikes equally upon the three inclined reflecting surfaces 28 and is reflected thereby in three separated beams to the screens or plate holders 21. The lens 13 must be so chosen as to its focal length and the casing 10 so proportioned that there is a distance from the lens to the reflectors 28 and from the reflector 28 to the screens or plate holders 21 equal to the focal length of the lens. The focusing of the images upon the screen may be attained by racking the shaft 23 or by the movement of the lens 13. I prefer to movably mount the lens 13 and to employ the shaft 23 for locating the images upon the screens or plate holders 21.

It is obvious that two or a greater number than three reflectors may be employed and a greater or less number than three screens or plate holders arranged opposite to such reflectors. Also, it is equally obvious that transparencies or views can be placed in the positions of the screens or plate holders 21 and illuminated and when so illuminated they will be in the focus of the lens 13 and be combined and projected thereby.

As a means for focusing the lens 13 I have shown the barrel 11 thereof provided with a collar 29 carrying the front part of the barrel which screws upon the threaded rear portion 30 of the barrel.

Having described my invention what I claim as new and desire to secure by Letters Patent is:—

1. An apparatus for securing a plurality of images of the same view comprising a lens, a pyramidal reflector, the axis whereof is disposed in the optical axis of said lens, means for moving said pyramidal reflector along its axis and means for receiving the images formed by said lens after they have been so reflected disposed in planes parallel to the movement of said reflector.

2. An optical system for producing and coalescing separate images of the same view comprising a lens, a pyramidal reflector, the axis whereof is disposed in the optical axis of said lens, means for moving said pyramidal reflector along its axis and means for receiving the images formed by said lens after they have been so reflected disposed in planes parallel to the movement of said reflector.

WARD H. SNYDER.